(12) United States Patent
Barringer et al.

(10) Patent No.: US 8,593,466 B2
(45) Date of Patent: Nov. 26, 2013

(54) TILE RENDERING FOR IMAGE PROCESSING

(75) Inventors: Rasmus Barringer, Helsingborg (SE); Tomas G. Akenine-Möller, Lund (SE)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 12/887,608

(22) Filed: Sep. 22, 2010

(65) Prior Publication Data

US 2011/0298813 A1    Dec. 8, 2011

Related U.S. Application Data

(60) Provisional application No. 61/352,424, filed on Jun. 8, 2010.

(51) Int. Cl.
| | |
|---|---|
| *G06F 15/80* | (2006.01) |
| *G06F 15/16* | (2006.01) |
| *G06T 1/00* | (2006.01) |
| *G06T 15/00* | (2011.01) |

(52) U.S. Cl.
USPC ............................ 345/505; 345/502; 345/522

(58) Field of Classification Search
USPC ......................................... 345/502, 505, 522
See application file for complete search history.

(56) References Cited

U.S. PATENT DOCUMENTS

| | | | | |
|---|---|---|---|---|
| 5,535,393 | A * | 7/1996 | Reeve et al. | 717/149 |
| 6,067,097 | A * | 5/2000 | Morita et al. | 345/505 |
| 6,717,576 | B1 * | 4/2004 | Duluk et al. | 345/419 |
| 6,753,878 | B1 * | 6/2004 | Heirich et al. | 345/629 |
| 7,119,809 | B1 * | 10/2006 | McCabe | 345/506 |
| 7,310,098 | B2 * | 12/2007 | Ohba | 345/428 |
| 7,447,873 | B1 * | 11/2008 | Nordquist | 712/22 |
| 7,633,506 | B1 * | 12/2009 | Leather et al. | 345/506 |
| 2002/0109853 | A1 * | 8/2002 | Ramachandran et al. | 358/1.9 |
| 2002/0180748 | A1 * | 12/2002 | Popescu et al. | 345/582 |
| 2004/0100471 | A1 * | 5/2004 | Leather et al. | 345/506 |
| 2004/0141655 | A1 * | 7/2004 | Aoyagi | 382/239 |
| 2005/0057571 | A1 * | 3/2005 | Stevens | 345/501 |
| 2005/0162434 | A1 * | 7/2005 | Hancock et al. | 345/501 |
| 2008/0068389 | A1 * | 3/2008 | Bakalash et al. | 345/505 |
| 2009/0136142 | A1 * | 5/2009 | Kosaraju | 382/232 |
| 2009/0303245 | A1 * | 12/2009 | Soupikov et al. | 345/582 |
| 2010/0164949 | A1 * | 7/2010 | Min et al. | 345/419 |
| 2011/0164807 | A1 | 7/2011 | Mitsui | |

FOREIGN PATENT DOCUMENTS

JP    11213143    1/1998

* cited by examiner

*Primary Examiner* — David T Welch
(74) *Attorney, Agent, or Firm* — Trop, Pruner & Hu, P.C.

(57) ABSTRACT

The time needed for back-end work can be estimated without actually doing the back-end work. Front-end counters record information for a cost model and heuristics may be used for when to split a tile and ordering work dispatch for cores. A special rasterizer discards triangles and fragments outside a sub-tile.

18 Claims, 3 Drawing Sheets

TILE RENDERING FOR IMAGE PROCESSING

CROSS-REFERENCE TO RELATED APPLICATIONS

This is a non-provisional application based on provisional application Ser. No. 61/352,424, filed on Jun. 8, 2010, hereby expressly incorporated by reference herein.

BACKGROUND

A tiling rendering architecture subdivides a computer generated image into smaller parts to be rendered separately. Each part is called a tile. The pipeline of a tiling rendering architecture often consists of a front-end and a back-end. The front-end performs vertex-shading on the vertices in the scene and sorts each resulting triangle into the tiles it overlaps. Note that shading of non-geometric attributes may be delayed until the back-end. The back-end, occurring after the front-end, processes each tile separately by vertex-shading any remaining attributes, rasterizing its triangles and pixel-shading the resulting fragments.

Parallel hardware with many independent execution units, called cores, needs a strategy to distribute rendering work evenly among the cores for full utilization of its resources, i.e. the work needs to be load balanced. This is extremely important as the rendering performance can be substantially higher depending on how this is done.

The front-end can split the scene geometry into suitable chunks for each core to process in parallel. Each such chunk is called a geometry batch. The splits can be arbitrary and, thus, it is easy to achieve good load balance in the front-end. The back-end is inherently parallel since each tile can be processed independently. This does, however, not guarantee a good load balance. Depending on the distribution of geometry and shading complexity in the scene, the majority of work may end up in only a few of the tiles. In the worst case, a single tile is expensive and the rest is cheap. This results in a load imbalance since the core that picks the expensive tile will require a lot of time to process it. During this time the remaining cores will be idle since they finish their work quickly.

DETAILED DESCRIPTION

Figure 1:
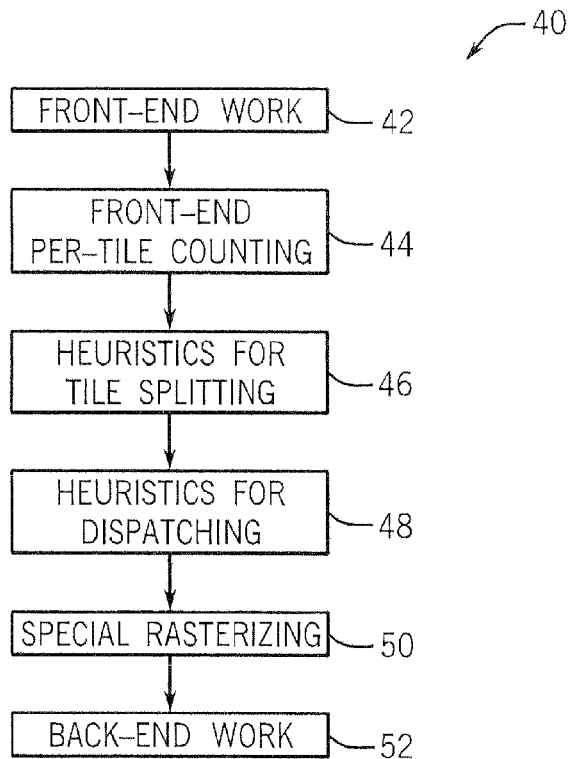
FIG. 1 is a flow chart for one embodiment.

A combination of techniques may be used to balance the load of the back-end in a tiling rendering pipeline. As shown in FIG. 1, after the front-end work 42, the components, in some embodiments, include a pipeline 40 used to estimate the cost of a given tile, front-end per-tile counters 44 recording information required by the cost model, heuristics 46 for when to split a tile, heuristics 48 for ordering the dispatching of work to the cores, and a special rasterizer 50 that discards triangles and fragments outside a sub-tile. Then the back-end work 52 may be done.

The only way to accurately find out how much time is required for a single core to perform the back-end work of a tile, is to actually perform the work. However, it is desirable to know approximately how long the required time is without actually doing the work. To that end, an inexpensive cost estimation model calculates how much time is required to perform the back-end work for a tile in one embodiment. When that has been done for all tiles, there is a significantly higher chance of distributing the work of all the tiles evenly among the available cores.

The cost estimation model may use data that can be recorded from a typical front-end to give an estimate for the time required to process a given tile in the back-end. In order to estimate the cost of a single triangle we need to know approximately how many samples it covers. Ideally, the area of the intersection between the "parent" tile and the triangle may be used as a measure of how many samples a triangle covers. This may not be feasible to compute since it may involve expensive clipping of each triangle. Alternatively, each triangle can be roughly classified using observations made in the front-end when determining overlapping tiles, e.g. if the triangle is covering the whole tile. Additionally, really small triangles may use a special code path in the rasterizer, motivating the need for a special classification for such triangles. The different classifications are called triangle types. Note that the triangle types are independent of the current rendering state such as pixel shading or z-buffer mode. The data for a given tile may include, but is not limited to the number of triangles of a certain triangle type binned to the tile, the sum of the pixel shading cost, e.g. cycles required to execute a certain pixel shader for a single fragment, for each triangle of a certain triangle type binned to the tile, and the number of triangles of a certain triangle type binned to the tile adhering to a specific rendering state, e.g. stencil-only or with early-z-cull enabled.

It is also useful to include counters for higher level constructs, such as the number of geometry batches containing triangles that overlap a tile. Each geometry batch will typically incur a certain amount of overhead.

The model may use this data to form linear and logarithmic terms whose weighted sum represents the time it takes to process the tile in some embodiments. The logarithmic terms are used to model occlusion, i.e. when a triangle is visible it will usually take longer time to process that triangle since all shading needs to be computed for the pixels covered by the triangle, and when the triangle is occluded (obscured) by previously rendered triangles, execution will be less expensive. A model may be used that converges to the logarithm of the number of overlapping triangles per pixel. See Cox, Michael, and Pat Hanrahan, "Pixel merging for object-parallel rendering: a distributed snooping algorithm," Proceedings of the 1993 Symposium on Parallel Rendering, pp. 49-56 (1993).

The weights are determined by fitting the model to measured timings. This fitting can be performed at runtime at suitable intervals or offline using data from numerous scenes. The logarithmic function used may be the floor of the 2-logarithm which is very efficient to calculate for integers. A non-linear model is:

$$t = A + \sum_i B_i x_i + C \log\left(1 + \sum_i D_i x_i\right) \tag{1}$$

where t is the processing time and $x_i$ are the values of the counters. A, $B_i$, C and $D_i$ are constants found through fitting. Since this model is non-linear, it is suitable for offline fitting. The value of 1 is added within the logarithm to ensure that the resulting value is zero when there are no contributing counters.

A linear model is:

$$t = A + \sum_i B_i x_i + \sum_i C_i \log(1 + x_i) \quad (2)$$

This model is suitable for runtime fitting since it is comparatively inexpensive to perform linear fitting.

It may not make sense to include logarithmic terms for all counters. Since the goal is to model occlusion, which saves shading time when a fragment is occluded, only shading-based counters for geometry with early-z-cull enabled may be included, in some embodiments, i.e. the constants for other logarithmic terms should be zero.

It is up to the implementer of the rendering pipeline to decide which terms to include in the cost estimation. If the linear model is used (Equation 2), all information can be gathered when rendering frame n, and before rendering of frame n+1 starts, the coefficients are recomputed based on the gathered information. These coefficients are then used in Equation 2 to estimate the cost of each tile. One can also update the coefficients with a sliding average update, such as:

$$a_{n+1} = k a_{new} + (1-k) a_n \quad (3)$$

where $a_i$ is a vector containing all the constants, i.e. A, $B_j$ and $C_j$, of the linear model.

This approach avoids sudden jumps in the cost estimation model that otherwise may cause values to oscillate even when rendering an identical frame multiple times. The oscillation is possible since changing the model may change how tiles are split. This may in turn change the measurements used to correct the model. The value of k is up to the user to set in the range of [0,1]. When k=1, we do not include the previous values of a, and when k=0, we do not include the new value (which is therefore meaningless). The value should be somewhere in-between, e.g. k=0.5.

The front-end is modified to include per-tile counters for the information required by the cost estimation model. Prior to the front-end, all such counters may be initialized to zero. Each time a triangle is binned to a tile, its triangle type is determined and the counter for that triangle type incremented. Other counters, e.g. those containing the sum of the pixel shader cost for a certain triangle type, are also modified accordingly.

Note that if the weights are known beforehand, e.g. from offline fitting, all counters for linear terms can be collapsed into a single score by pre-multiplying the weights, thus reducing the storage requirements.

Figure 2:
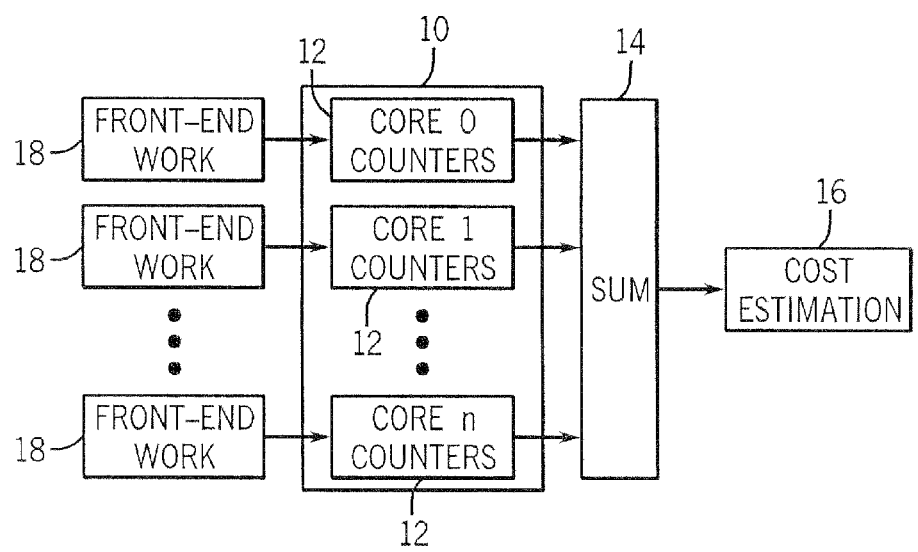
FIG. 2 is a flow chart for one embodiment.

Since several cores typically access the same counters, it may be beneficial to have a unique set 10 of counters 12 for each core, as shown in FIG. 2. This way, inter-core synchronization can be avoided. When estimating the cost for a tile, these per-core counters 12, coupled to front end work 18, need to be accumulated (as indicated at 14) into a single set of counters used by the cost estimation model 16.

Figure 3:
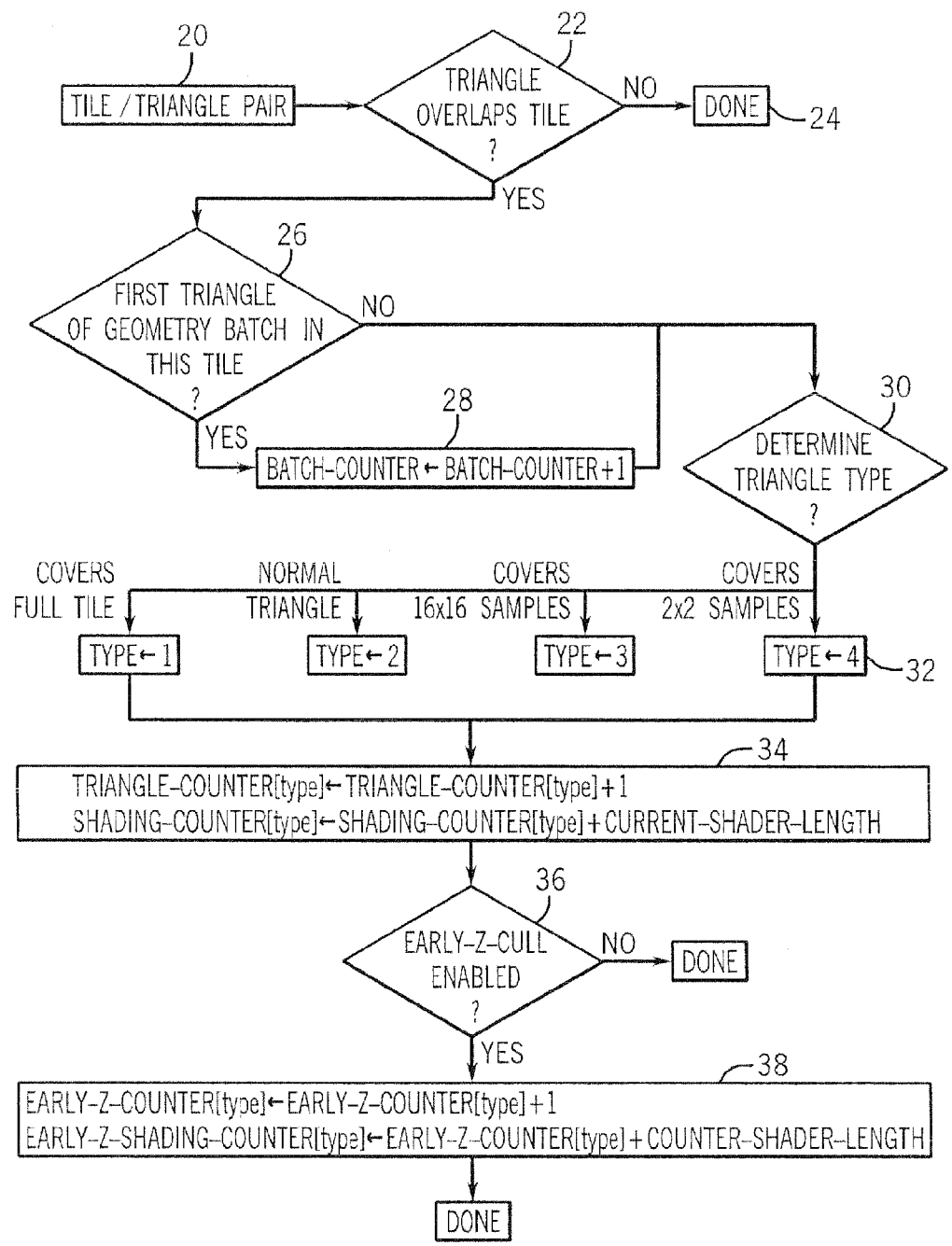
FIG. 3 is a flow chart for one embodiment.

An example of how the front-end increments its counters, when a triangle is binned to a tile, is shown in FIG. 3. A tile/triangle pair is received at 20. A check at diamond 22 determines whether the triangle overlaps the tile. If not, the flow is over, as indicated at 24. If so, a check at diamond 26 determines whether this is the first triangle of a geometry batch in this tile. If so, then the batch counter is incremented at 28. Then, the triangle type is determined at diamond 30. At the next stage, indicated at 32, a type one is indicated if the triangle covers the full tile, a type two is indicated if it is a triangle that does not fall within the other types, a type three is indicated if it covers 16×16 samples, and a type four is indicated if it covers 2×2 samples. Other triangle types are possible depending on the rasterization architecture. Then, at 34, the Triangle-Counter[type] is incremented and the current shader length is added to the Shader-Counter[type].

At diamond 36, a check determines whether early-Z-cull (i.e. Z-culling before pixel shading) is enabled. If not, the flow is done and, otherwise, the Early-Z-Counter[type] is incremented at block 38 and the current shader length is added to the Early-Z-Shading-Counter[type].

After the front-end, the splitting heuristic 46 (FIG. 1) is used to determine which tiles to split. As an example, if a tile covers 128×128 pixels, the tile may be split into two non-overlapping 64×128 sub-tiles. The idea is that the cost for rendering one such sub-tile will be approximately half of the rendering time of the full tile. Hence, tile splitting can potentially reduce the time required to render a tile to 50% if the tile is split, and the sub-tiles' back-end work is performed on two cores in parallel.

The first step of the splitting heuristic is to estimate the cost of all tiles using the cost estimation model and the per-tile counters. The n most expensive tiles are then selected and split recursively until the cost of each sub-tile is below a certain threshold th (with the assumption that the cost of a sub-tile relative the cost of the whole tile is in direct relation to their areas in pixels). There is generally a certain overhead associated with splitting a tile. It is therefore advantageous to only split when it is actually needed. Oversplitting can lead to worse performance. If a scene has several independent render targets and/or multiple frames in flight at the same time, it might not be beneficial to split even expensive tiles. Because of this the threshold, th, is modified according to the amount of work in concurrent render targets.

The ordering heuristic 48 (FIG. 1) attempts to get expensive tiles started with their back-end work as early as possible. This reduces the load imbalance at the end of the back-end. Therefore, the tiles are sorted based on their estimated cost, after splitting. They are then dispatched to available cores in that order, starting with the most expensive (sub-) tiles. If the tiles were sorted during the splitting phase, it may be unnecessary to sort them again. In this case the sub-tiles could all be inserted at an appropriate location in the work queue to ensure approximate cost based ordering.

A special rasterizer 50 (FIG. 1) may be used for the tile splitting purpose. Without the special rasterizer, it would be less beneficial to split a tile. After splitting, one could redistribute a tile's triangles amongst its sub-tiles, i.e. test which sub-tiles a triangle overlaps, and for each such sub-tile, put the triangle in the sub-tile's triangle list. However, this does not fit well into the front-end/back-end divided pipeline. It would simply require a lot of changes to the current pipeline to make this happen. A better way is to let each core working on a sub-tile go through the entire triangle list of the "parent" tile. The special rasterizer then discards triangles outside the sub-tile's region. It may also be modified to efficiently discard fragments outside the sub-tile during scan conversion. During hierarchical rasterization, the special rasterizer simply terminates the hierarchical traversal if the code reaches pixel regions outside the subtile's pixel region. This makes the changes very small and compact to current pipelines, which is highly desirable in some embodiments. It may also incorporate a triangle bounding-box test prior to scan conversion in order to quickly reject triangles that are outside the sub-tile altogether. In one embodiment, a tile is always split in half, along the longer axis, which results in dimensions that are always a power of two (assuming that the parent tile's dimensions are a power of two). Most rejection tests can thus be implemented using efficient shift operations.

Offline rendering with renderers based on rasterization can be used in some embodiments. Since rendering cost is much more expensive in this case, the estimation cost will be relatively less expensive, and therefore it makes sense to use this technique also in that context. In addition, some embodiments can also be used to great benefit also for higher order primitives (e.g., displaced Bézier surfaces, displaced subdivision surfaces, and arbitrary displacement shaders).

Some embodiments may balance the load of a single render target to maximize utilization and minimize latency. At the same time, the memory footprint may not be significantly increased. A special rasterizer may, in some cases, make the implementation substantially less complex.

Figure 4:
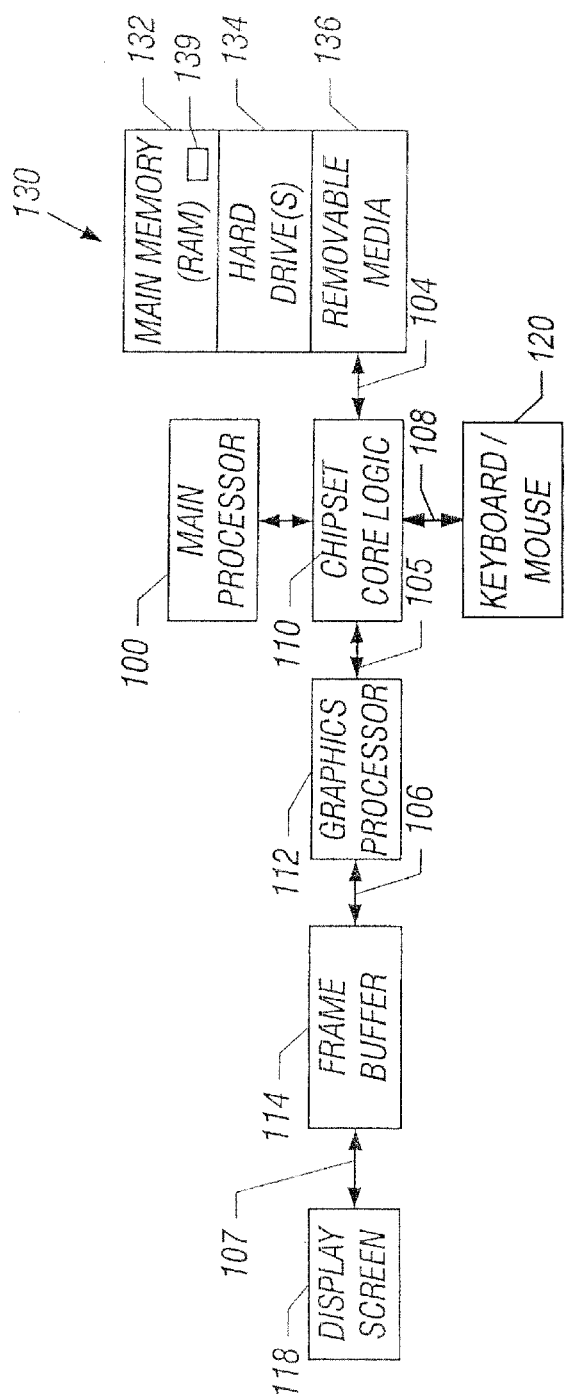
FIG. 4 is a system depiction for one embodiment.

The computer system 130, shown in FIG. 4, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture. It may include multiple cores, each core associated with a counter, shown in FIG. 2.

In the case of a software implementation, the pertinent code may be stored in any suitable semiconductor, magnetic, or optical memory, including the main memory 132 or any available memory within the graphics processor. Thus, in one embodiment, the code 139 to perform the sequences of FIGS. 1-3 may be stored in a non-transitory machine or computer readable medium, such as the memory 132 or the graphics processor 112, and may be executed by the processor 100 or the graphics processor 112 in one embodiment.

FIGS. 1-3 are flow charts. In some embodiments, the sequences depicted in these flow charts may be implemented in hardware, software, or firmware. In a software embodiment, a computer readable medium, such as a semiconductor memory, a magnetic memory, or an optical memory may be used to store instructions and may be executed by a processor to implement the sequences shown in one or more of the flow charts depicted in FIGS. 1-3.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for tile splitting comprising:

estimating, by a processor, time needed for back-end processing on a tile in a tiling rendering pipeline separately from time to process front-end work on the tile, wherein front-end processing includes performing vertex shading on the vertices in a scene and sorting a resulting triangle to a tile it overlaps and wherein back-end processing occurs after the front-end processing and processes each tile separately by vertex shading any remaining attributes, rasterizing its triangles and pixel shading the resulting fragments;

using only data from front-end processing to estimate the time needed for back-end processing before starting the back-end processing; and deciding whether to split a tile into sub-tiles based on the estimated time needed for back-end processing on the tile.

2. The method of claim 1 including identifying triangle types and using said types for estimating.

3. The method of claim 2 including identifying triangle types based on whether a triangle covers an entire tile.

4. The method of claim 3 including identifying triangle types based on a number of samples covered by the triangle.

5. The method of claim 1 including determining whether early-z-cull is enabled to estimate the time.

6. The method of claim 1 including using a plurality of cores and enabling each core working on a sub-tile split from a tile to go through all the triangles in the tile to determine which triangles fall within the core's assigned sub-tile.

7. A non-transitory computer readable medium storing instructions to enable a processor to:

estimate time needed for back-end processing per tile in a tiling rendering pipeline using a cost estimation model separately from time to process front-end work on the tile, wherein front-end processing includes performing vertex shading on the vertices in a scene and sorting a resulting triangle to a tile it overlaps and wherein back-end processing occurs after the front-end processing and processes each tile separately by vertex shading any remaining attributes, rasterizing its triangles and pixel shading the resulting fragments;

use only data from front-end processing to estimate the time needed for back-end processing before starting the back-end processing; and decide whether to split a tile into sub-tiles based on the estimated time needed for back-end processing on the tile.

8. The medium of claim 7 further storing instructions to identify triangle types and use said types for estimating.

9. The medium of claim 8 further storing instructions to identify triangle types based on whether a triangle covers an entire tile.

10. The medium of claim 9 further storing instructions to identify triangle types based on a number of samples covered by the triangle.

11. The medium of claim 7 further storing instructions to determine whether an early-z-cull is enabled to estimate the time on a per-tile basis.

12. The medium of claim 7 further storing instructions to use a plurality of cores and enable each core working on a sub-tile split from a tile to go through all of the triangles in the tile to determine which triangles fall within the core's assigned sub-tile.

13. An apparatus comprising:
a cost estimation unit to determine whether to split a tile based on the time needed for back-end processing on the tile separately from front-end work, wherein front-end processing includes performing vertex shading on the vertices in a scene and sorting a resulting triangle to a tile it overlaps and wherein back-end processing occurs after the front-end processing and processes each tile separately by vertex shading any remaining attributes, rasterizing its triangles, pixel shading the resulting fragments, and said unit to use only data from front-end processing to estimate the time needed for back-end processing before starting the back-end processing; and
a multiple-core processor.

14. The apparatus of claim 13 including a set of counters for each core, said counters to develop a cost estimation model.

15. The apparatus of claim 14 wherein said counters are coupled to a summation device.

16. The apparatus of claim 15 including a cost estimation unit coupled to said summation device.

17. The apparatus of claim 13 including an estimation unit to estimate the time needed for back end work in a tile rendering pipeline.

18. The apparatus of claim 17 wherein said estimation unit identifies triangle types and uses said types for estimating.

* * * * *